United States Patent [19]

Bös

[11] 4,101,205
[45] Jul. 18, 1978

[54] DRIVING MIRROR ASSEMBLY

[75] Inventor: Horst Bös, Göppingen, Fed. Rep. of Germany

[73] Assignee: Gebr. Marklin & Cie. GmbH, Goppingen, Fed. Rep. of Germany

[21] Appl. No.: 713,061

[22] Filed: Aug. 9, 1976

[51] Int. Cl.² ............................................. G02B 5/08
[52] U.S. Cl. .................................... 350/289; 248/481
[58] Field of Search ................ 350/288, 289; 248/479, 248/481–483, 487

[56] References Cited
FOREIGN PATENT DOCUMENTS

| | | |
|---|---|---|
| 2,436,995 | 2/1976 | Fed. Rep. of Germany ....... 350/289 |
| 2,521,717 | 11/1975 | Fed. Rep. of Germany ....... 350/289 |

*Primary Examiner*—F. L. Evans
*Attorney, Agent, or Firm*—William Anthony Drucker

[57] ABSTRACT

The driving mirror assembly comprises a carrier and mirror pivotable in relation to a base by motor driven spindles. The carrier is mounted on the base by a universal ball joint and is coupled to the base by a cross piece of spring sheet metal which engages around the universal joint. The spring sheet metal is cruciform in shape so as to have four connecting points, a diagonally opposite plan of points being connected respectively to a pair of posts attached to the carrier and the other diagonally opposite pair of points being connected respectively to a pair of posts arranged on said base.

3 Claims, 4 Drawing Figures

DRIVING MIRROR ASSEMBLY

BACKGROUND TO THE INVENTION

This invention relates to a driving mirror assembly having a carrier and mirror glass pivotable in relation to a base by two threaded spindles driven by electric motors. The mirror glass, mounted on a pedestal, is pivotable by means of the two electric motors about a universal joint (for example a ball joint or a cruciform joint) according to choice, about the region of intersection of pivoting axes. As coupling elements between the nuts of the threaded spindles and the carrier, there may be used cruciform joints mounted for pivoting one on each of the nuts.

SUMMARY OF THE INVENTION

The invention is characterised in that between the carrier of the mirror glass and the base, there extends a cross piece of spring sheet metal which engages around the universal joint, so that two posts of the carrier and two posts of the base, with the spring sheet metal cross piece, diagonally form a rotational securing for the carrier of the mirror glass.

The spring sheet metal cross piece keeps forces away from the two driving mechanisms, which therefore are of long-lasting operational reliability.

BRIEF DESCRIPTION OF DRAWINGS

The invention will be explained in greater detail hereinafter by reference to an example of embodiment which is illustrated in the accompanying drawings, wherein.

DESCRIPTION OF PREFERRED EMBODIMENT

Figure 1:
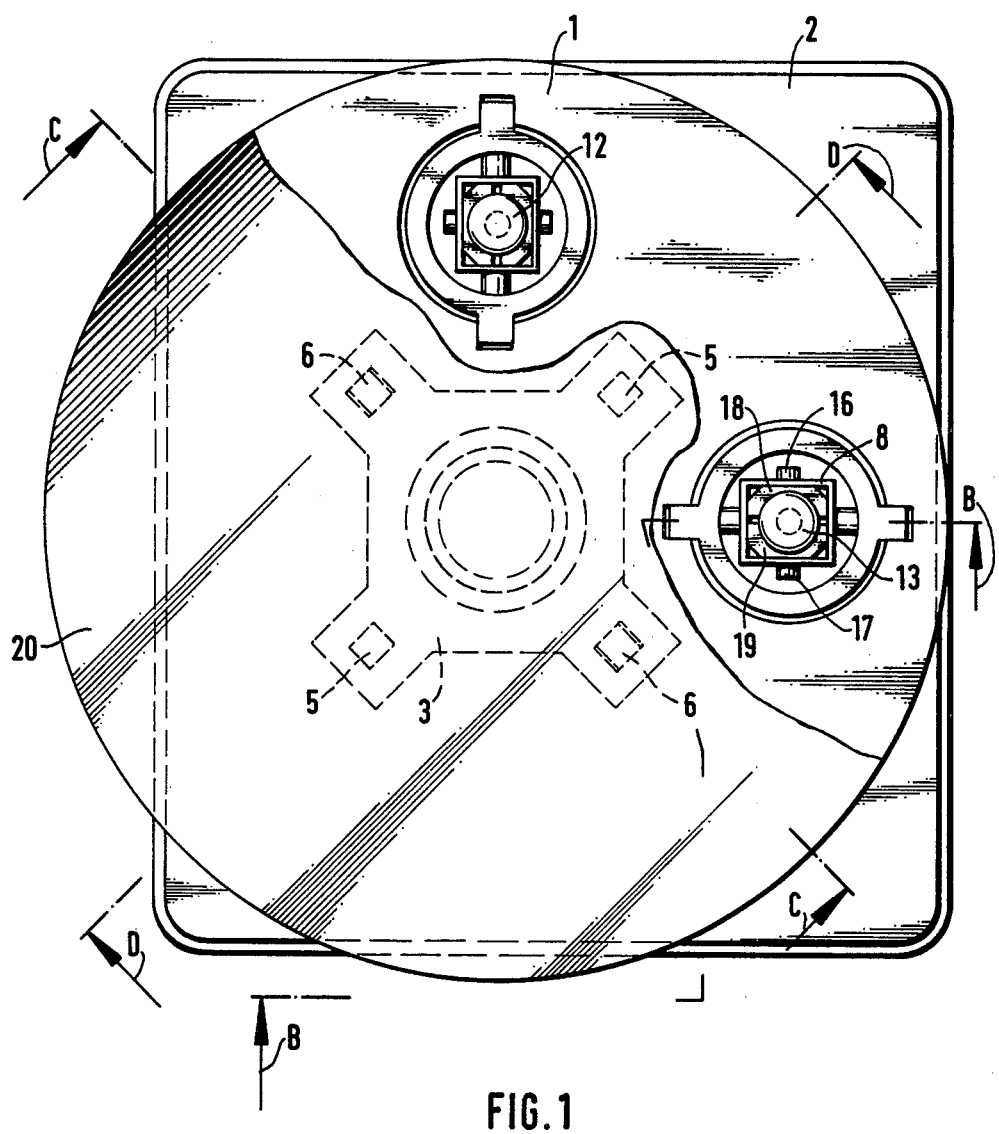
FIG. 1 represents the example of embodiment in plan view (a part of the mirror glass being broken away above the two drive mechanisms)
Figure 2:
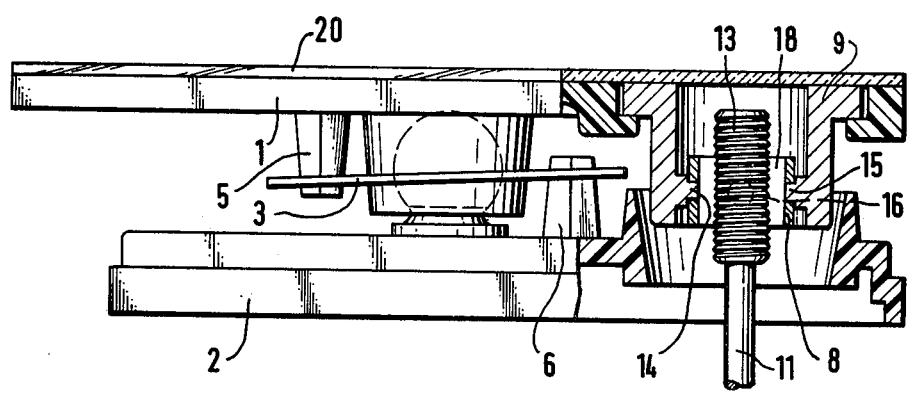
FIG. 2 shows the car mirror assembly according to FIG. 1 in cross section along the line B—B in FIG. 1.
Figure 3:
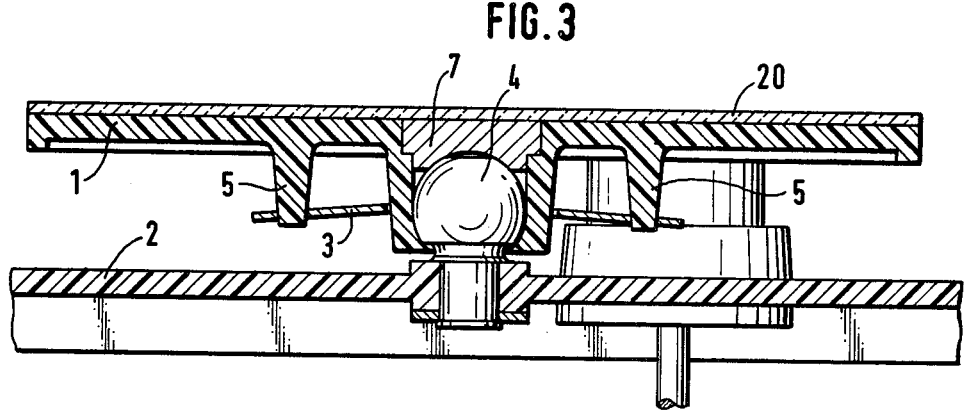
FIG. 3 shows the cross section along the line D—D in FIG. 1.
Figure 4:
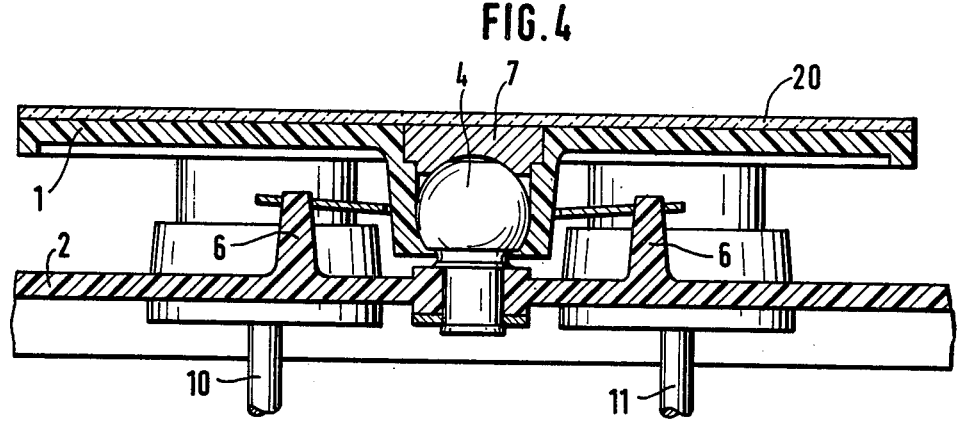
FIG. 4 shows the cross section along the line C—C in FIG. 1.

As shown in the drawings, a carrier 1 for a mirror glass 20 is mounted on a base 2 by means of a universal joint which consists of a ball 4 and socket 7. Extending away from the carrier 1 towards the base 2 are a pair of posts 5 on diametrically opposite sides of the universal joint. Similarly a pair of posts 6 extend away from the base 2 towards the carrier 1. A spring sheet metal member 3 in the form of a cross, is mounted on the socket of the universal joint and has two opposite arms supported by the posts 6 and the other two arms supported by the posts 5. The carrier 1 is thus supported against rotation relative to the base 2, while the pivoting of the base about the universal joint remains possible as a result of the resilient nature of the sheet metal member 3.

Means for pivoting the carrier 1 about the universal joint include two spindles 10, 11 independently driven by electric motors (not shown). Mounted on the side of the carrier 1 which faces towards the base 2 is a ring 9 formed towards its end remote from the carrier with a pair of opposite inwardly extending pins 15. These pins support a case 8 in a manner which allows the case to pivot about the axis of the pins 15. Supported within the case 8 is a two part nut 18, 19 the two parts of which have pins 16 and 17 respectively extending radially outwardly therefrom and supported by the case in a manner which allows the nut to pivot about the axis of the pins 16, 17. The spindle 11 has a threaded end portion 13 which meshes with the nut 18/19. This arrangement ensures the pivoting of the carrier 1 relative to the base 2 when the spindle is rotated. The other spindle 10 carries a threaded end portion 12 which is operatively connected with the carrier 1 in a similar manner. The spindle 10 serves to pivot the carrier about a first axis passing through the universal joint 4, 7 while the spindle 11 serves to pivot the carrier about a second axis perpendicular to the first.

If one of the two electric motors is switched on, its threaded spindle 11 rotates so that the mirror 20 is pivoted. The mirror cannot rotate. The drive members are therefore designed to be light and cheap with delicate members.

I claim:

1. A driving mirror assembly comprising:
    a base;
    a carrier for a mirror glass the mirror glass, said carrier being supported on said base by means of a universal joint;
    first means for pivoting said carrier relative to said base about a first axis passing through said universal joint;
    second means for pivoting said carrier relative to said base about a second axis passing through said universal joint and perpendicular to said first axis;
    a plurality of first posts formed on said base and extending towards said carrier;
    a plurality of second posts formed on said carrier and extending towards said base;
    a sheet of spring metal positioned about said universal joint and supported by said first and second posts to prevent said carrier from rotating.

2. A driving mirror assembly according to claim 1, wherein the sheet of spring metal is of cruciform shape having first and second pairs of diagonally oppositely extending arms, said first pair of diagonally oppositely extending arms being supported by said first posts and said second pair of diagonally opposite arms being supported by said second posts.

3. A driving mirror assembly according to claim 1, wherein said first and second means for pivoting said carrier relative to said base each comprise a threaded shaft, a nut carried by the threaded shaft and means coupling the nut to the carrier.

* * * * *